April 18, 1961

L. LEVY 2,980,840

WIDE BAND, LOW DISTORTION, HIGH EFFICIENCY AMPLIFIER

Filed Aug. 8, 1958

INVENTOR.
Lester Levy
BY
ATTORNEY

April 18, 1961  L. LEVY  2,980,840
WIDE BAND, LOW DISTORTION, HIGH EFFICIENCY AMPLIFIER
Filed Aug. 8, 1958  2 Sheets-Sheet 2
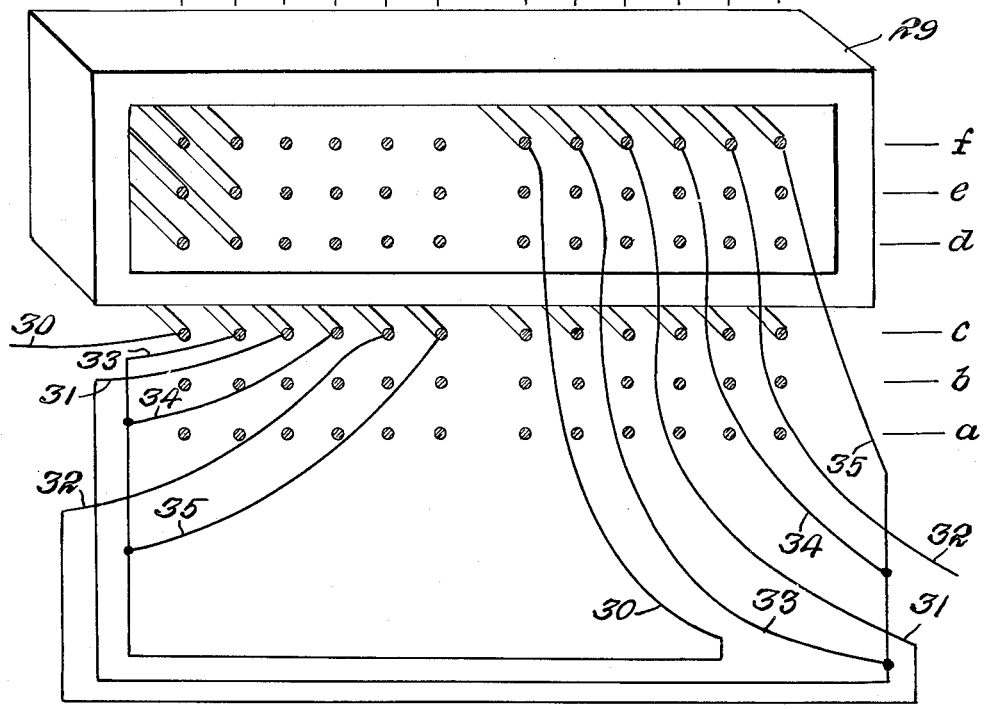
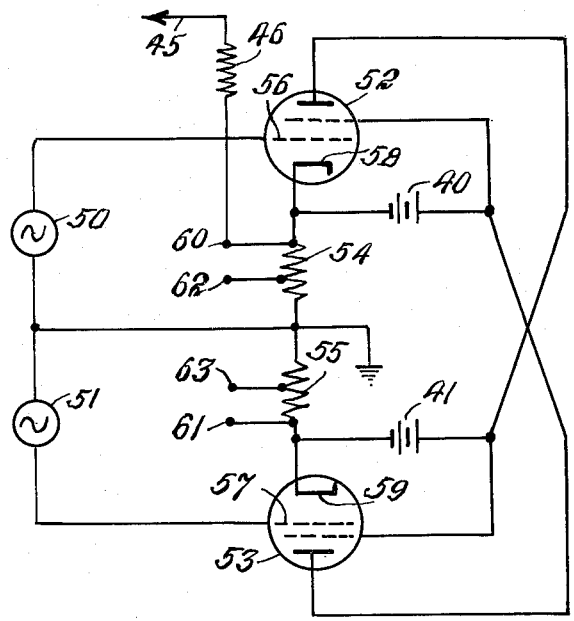
INVENTOR.
Lester Levy
BY
ATTORNEY – # United States Patent Office 2,980,840
Patented Apr. 18, 1961

2,980,840

WIDE BAND, LOW DISTORTION, HIGH EFFICIENCY AMPLIFIER

Lester Levy, 535 Parkside Ave., Brooklyn 26, N.Y.

Filed Aug. 8, 1958, Ser. No. 753,907

7 Claims. (Cl. 330—121)

This invention relates to amplifiers and more particularly to a wide band, low distortion, high efficiency amplifier.

In general, I provide an improved amplifier by employing novel circuitry of minimum reactive phase shift between stages, as well as between the output stage and the secondary terminals of the output transformer and by further utilizing large amounts of negative feedback directly coupled from such secondary to a suitable point in the circuit. Such minimizing of phase shift permits large amounts of negative feedback to be employed as otherwise the feedback would be in improper phase and would produce instability and distortion. In particular, taking large amounts of negative feedback from the transformer secondary terminals is conventionally impractical because of leakage inductance which results in varying phase shift over a frequency band. According to my system, however, it is practical to take such large amounts of negative feedback from the transformer secondary since I employ a novel transformer which involves minimum leakage inductance. This is accomplished through a multifilarly wound transformer, i.e., wherein two or more conductors are simultaneously wound over a core. By the term "multifilar" I include bifilar windings which may be employed in multiple, i.e., a number of bifilar windings. In general, one winding serves as a primary and the adjacent winding as a secondary. Such a transformer produces extremely tight coupling between the windings such as to avoid leakage flux and consequent phase shift. Additionally, the transformer is best utilized as an autotransformer which further reduces the leakage inductance.

In my system, I also connect the transformer so as to substantially eliminate any D.C. current therethrough in spite of the fact that the transformer is used as the output of a push-pull circuit. Ordinarily, in a push-pull circuit, the static D.C. and signal components of each output tube flows through ½ of the primary winding. With my system, however, the direct current of each tube flows through the entire winding, but in opposite directions so as to cancel the D.C. and leave only the A.C. signal currents. The elimination of D.C. improves transformer efficiency and is useful in increasing the incremental inductance of the winding. Further, the utilization of the entire winding by the alternating signal currents of each tube decreases the total number of turns relative to conventional push-pull systems. Accordingly, a greater primary inductance may be secured because more turns for each tube is employed in spite of the fact that the number of turns in the complete primary winding is less. This also decreases the A.C. magnetizing current so as to increase the ratio of load or signal current relative to the core magnetizing current producing superior low frequency response.

In addition, since both output tubes share the same primary winding and the total number of turns is thereby decreased, a smaller, lighter and more economical transformer is made possible.

Both output tubes share the same primary winding by employing separate power supplies of equal magnitude for each of the output tubes as will hereinafter be made clear.

As another aspect of this invention, and for the purpose of avoiding phase shifts between stages, I use direct coupling between the driver stages and the push-pull output stages so as to eliminate a coupling capacitor. Broadly speaking, this is of course, not new. However, I do not use resistance coupling as is conventional. On the contrary, I connect the plates of the driver tubes directly to the grids of the push-pull tubes without loading of the driver stages by a grid resistor. This applies the full A.C. voltage developed by the driver on such grids. It will further be noted that I use a moderate voltage for the plates of the driver tubes. However, I use an additional D.C. voltage supply on the driver cathodes, of such polarity as to be additive in respect to D.C. voltage differences between the plate and cathode. This additional cathode voltage serves to provide a proper bias voltage for the grids of the succeeding output stage.

Many of the advantages of my circuit are obtainable without employing an output transformer as will be explained hereinafter.

The invention will be further understood from the following description and drawings in which:

Figure 3 is a view physically illustrating a multifilar transformer such as is shown in Figure 1; and Figure 4 is a modified embodiment where many advantages of the circuit are obtained while eliminating an output transformer.

Figure 1:
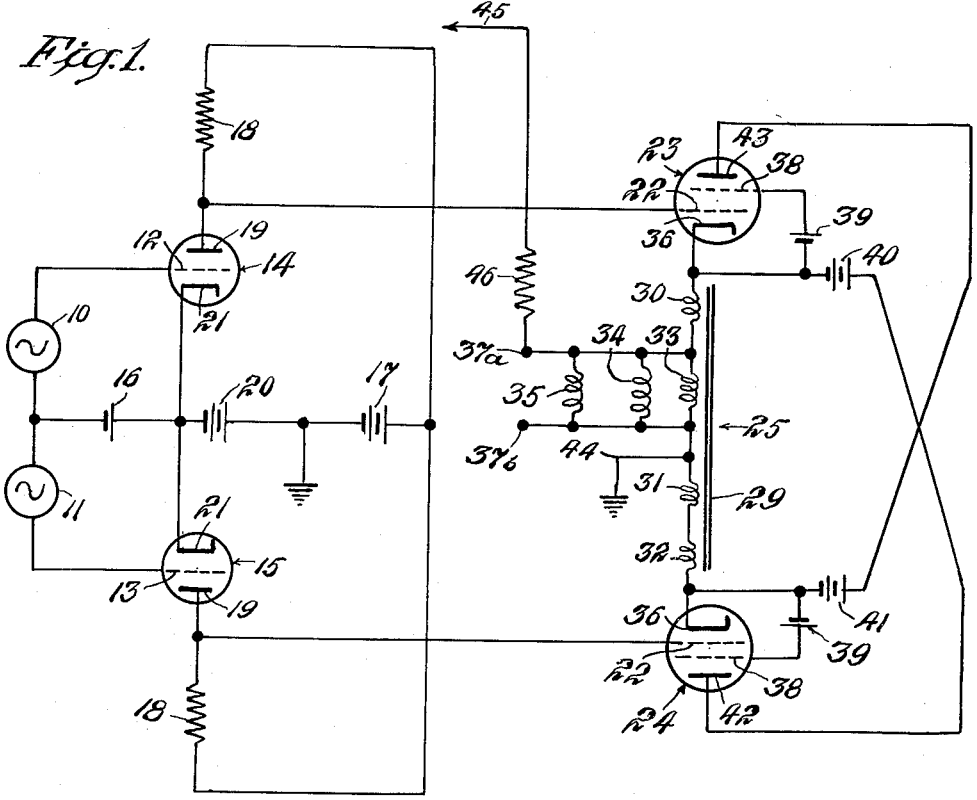
Figure 1 is a schematic view illustrating my over-all system in its novel aspects.

Preceding parts of the amplifier, not shown, will provide wide band signals at sources 10 and 11 which, as well known, will be of opposite phase for properly feeding the push-pull stages. These signals are applied to the respective grids 12 and 13 of the driver tubes 14 and 15. Voltage source 16, illustrated as a battery, provides suitable bias for the tubes 14 and 15. The magnitude of the bias source will determine the actual D.C. voltage on the plates of tubes 14 and 15 and will therefore determine whether the power tubes, as hereinafter described, are operating as Class A, AB, B, etc.

Anode voltage is supplied by D.C. source 17. Purely as an example, battery 17 may be about 300 volts. The usual plate load resistors 18 are provided. These may be in the order of ½ megohm. It is understood of course, that these figures are purely representative. In order to avoid excessive D.C. voltage on the control grids of the power tubes which comprise the next stage, I employ an additional power supply 20 which is connected to the cathodes 21. In respect to ground, power supplies 17 and 20 are of opposite polarity, the ground connection being between these power sources.

It will be observed that plates 19 of the driver tubes are directly connected to control grids 22 of the push-pull tubes 23 and 24. Accordingly, the full A.C. voltage developed by tubes 14 and 15 is applied to the push-pull control grids 22. Power supply 20 may be in the order of 300 volts so that, with the voltage drop in resistors 18, the resultant voltage difference across tubes 14 and 15 will be 265 volts although only −35 volts will be applied to the output stage grids. This provides proper operation for the tubes 14 and 15 for the purposes of delivering A.C. voltages while avoiding excessively high D.C. voltages on the directly coupled control grids 22, a problem which is considerable in conventional directly coupled stages. Further, no grid resistor is employed on grids 22 so as to minimize loading of the driver tubes 14 and 15. Accordingly, although high voltages are used for the driver tubes, and although I use a direct coupled circuit, nevertheless the bias voltage on grids 22 is of a low order, avoiding dangerous operation of the output tubes.

Figure 2:
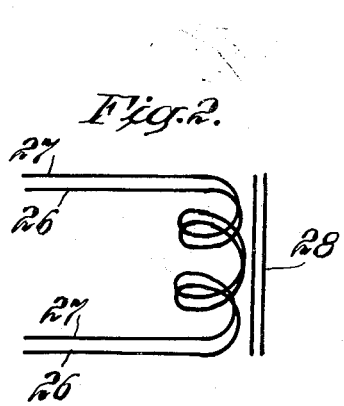
Figure 2 is a simplified view illustrating the basic winding of a bifilar transformer.

A most important element of this invention is the construction and connection of the output transformer 25. Output transformer 25 is multifilarly wound. Referring to Figure 2, I show a bifilar transformer consisting of two windings 26 and 27 each of which may have the usual insulating coating. Windings 26 and 27 are simultaneously wound around the core 28 this representing a most simplified form of the improved transformer. This construction produces maximum or substantially unity coupling between the windings so as to avoid leakage flux. Accordingly, if winding 26 is the primary and winding 27 the secondary, there will be minimum phase shift at the output terminals of the secondary 27.

Referring now to Figures 1 and 3, the core 29 is provided with six windings 30, 31, 32, 33, 34, and 35, all wound simultaneously.

In order to clarify the physical construction of the transformer and the manner in which the conductors are sequentially wound over the core, Figure 3 diagrammatically illustrates the actual winding thereof. Windings 30–35 are formed by conductors disposed side by side and simultaneously wound around core 29. They are so wound as to provide adjacent and alternate windings for reasons to be explained hereinafter.

With reference to Figure 3, the conductors may be identified at any point of their windings by the small and capital letters indicated. Thus, tracing the course of winding 30, we observe that it is wound around the core 29 by first passing to the rear at A$c$, then coming forward inside the core window at A$d$ to substantially complete the first turn thereof. At this point the conductor descends downwardly and forms another turn by passing to the rear at G$c$ and then coming forward inside the core window at G$d$. The reason for thus spacing the turns of the same conductor is to allow room for the remaining five conductors to assume adjacent and alternate positions on the core. From point G$d$, conductor 30 passes to the rear at G$b$, coming forward at G$e$ to form another turn. The conductor then rises up, passing to the rear at A$b$, coming forward at A$e$, passing to the rear at A$a$, coming forward at A$f$, passing to the rear at G$a$ and terminating at G$f$, thus comprising six complete turns.

Conductors 33, 31, 34, 32 and 35 are wound simultaneously with conductor 30, adjacent to each other in the order shown, with conductor 33 being wound similar to conductor 30 and passing through reference points B$c$, B$d$, H$c$, H$d$, H$b$, H$e$, B$b$, B$e$, B$a$, B$f$, H$a$, H$f$.

In accordance with Figure 1, four of such windings, i.e., windings 30, 31, 32 and 33, may be connected in series between the cathodes 36 of the push-pull output tubes, to constitute a single primary winding between such tubes. This leaves two windings, 34 and 35 which may be connected in parallel with one of the primary winding sections, i.e., winding section 33 so as to result in three parallel secondaries.

In order to realize the full benefits to be derived from the above described transformer construction, alternate windings are connected in series, or in parallel, and consequently every secondary winding is immediately adjacent to a primary winding, giving low leakage inductance. In other words, alternate conductors are used for primaries and the remainder for secondaries.

Ordinarily, when a multifilarly wound transformer is employed, there might be a considerable problem in impedance matching of the transformer secondary to the load, such as the voice coil of the speaker. Of course, transformer terminals 37$a$ and 37$b$ are ordinarily applied to the load. The basis of the problem is the fact that the ratio of primary to secondary turns determines the impedance change. The maximum ratio obtainable results when all the secondary windings are connected in parallel and the secondary group is connected in series with all the primary windings which are themselves in series. It will be understood that more than three secondary windings may be employed in parallel. In Figure 1, the turns ratio is 4 to 1. The disposition of the windings 30 to 33 in series applies the usual higher impedance required for the output of the tubes 23 and 24.

It will be observed that transformer 25 is actually connected as an autotransformer. This further reduces the leakage inductance and increases the efficiency relative to transformers where the primary and secondary are separately wound.

Tubes 23 and 24 are illustrated as being tetrodes although of course triodes, pentodes, transistors, gaseous amplifiers or other amplifying devices may be used if desired. In the case of tetrodes the screen grids 38 are connected to the cathodes 36 through D.C. supplies 39 so as to maintain the screen grids at the same A.C. potential as their respective cathodes.

A most important aspect of the circuitry of Figure 1 is the utilization of separate power supplies 40 and 41 for the respective tubes 23 and 24. Power supply 40 serves tube 24 in applying the D.C. voltage between the plate 42 and the cathode 36 of the tube, the primary winding of transformer 25 being completely included in the cathode circuit. In the same way, power supply 41 applies the proper voltage between the plate 43 and the cathode of tube 23, the entire primary winding of transformer 25 also being in the cathode circuit. Accordingly, both output tubes 23 and 24 share the very same primary winding. This novel arrangement reduces the total number of turns ordinarily required and gives the advantages set forth hereinabove. Further, the secondary windings are likewise included in the cathode circuit.

It will be noted that the transformer 25 has a grounded center tap 44. This has the advantage of reducing to one-half the voltage required from the driver tubes 14 and 15 since such driving voltage need flow through only one-half the transformer winding at a time. This has a further advantage since large A.C. driving voltages, while useful for driving the power stage to full capacity, are actually more often undesirable because they may tend to operate the driver tubes at a non-linear portion of their characteristic curves so as to produce distortion. In the above circuit, however, the output tubes may be driven with only one-half the normally required A.C. voltage. Further, I employ, as stated above, high D.C. voltages in the driver stages which easily and safely accommodates the required driving voltages for the output tubes.

Point 37$a$ may serve as a negative feedback connection point, said point being an output terminal of the secondary of the transformer, the arrow 45 indicating a connection to a preceding portion of the circuit as is well understood in negative feedback connections. The value of direct coupling resistor 46 is well understood and is determined in accordance with the formula $$\frac{A'}{A}=\frac{1}{1+\left(\frac{AR_1}{R_1+R_2}\right)}$$

Where A is the voltage gain of the amplifier between point 37$a$ and the point to which 45 will be connected, without feedback And A' is the voltage gain of the amplifier between point 37$a$ and the point to which 45 will be connected, with feedback And $R_1$ is the resistance of the circuit to which arrow 45 will be connected And $R_2$ is the resistance of resistor 46

In a typical case where A is 2500, A' is desired to be 25, $R_1$ is 1500 ohms, then $R_2$ is determined to be 36,300 ohms.

The entire circuit herein described provides a wide band amplifier which is of extremely low distortion by virtue of the large amounts of negative feedback which may be taken from point 37a. The absence of coupling capacitors in the feedback circuit and between amplifier stages, and the low leakage inductance of the transformer 25 permits this practice. Further, the amplifier has other advantages such as the development of the large A.C. driving voltages on the output grids 22 and the economies which will be effected as herein described.

In Figure 4 is shown an output circuit which dispenses with an output transformer while still employing the separate power supplies 40 and 41 for the purpose above described. In the circuit of Figure 4, driver stages have not been illustrated, it being assumed that the signals from sources 50 and 51 are suitable for driving the output tubes 52 and 53 (corresponding to tubes 23 and 24 of the previous embodiment) while providing the correct D.C. bias voltage for the power tube control grids as explained hereinabove in connection with control grids 22.

The circuit of Figure 4 may be employed where impedance transformation is not required as where the actual load impedance is correct for the particular output tubes or combination of output tubes employed.

Resistors 54 and 55 are for the purpose of maintaining a D.C. path between control grids 56 and 57 and their corresponding cathodes 58 and 59 (corresponding to grids 22 and cathodes 36), the resistors being of a value (e.g., 25,000 ohms in connection with output tubes like type 6CB5) to absorb negligible A.C. power from the amplifier. The output load impedance is connected to terminals 60 and 61. Such a circuit provides an output transformerless amplifier and further improves the range of response and diminution of distortion. A feedback connection may be taken from points 60 or 61, or any intermediate points such as 62 and 63 comprising taps on resistors 54 or 55.

What is claimed is:

1. A wide band low distortion amplifier comprising a plurality of cascaded amplifier stages including a push-pull output stage having first and second amplifiers, each said output stage amplifier having signal input, cathode and anode electrodes; means supplying direct current to said output stage; means supplying an input signal to said input electrode; output transformer means connected between said cathodes, said transformer comprising a unity coupling multifilarly wound autotransformer including a plurality of primary and secondary windings connected in series and arranged alternately so that each said primary winding is adjacent an alternate secondary winding, whereby leakage inductance and phase shift in said transformer are minimized.

2. The device of claim 1 including means connected between said output stage anodes and cathodes to cause alternating signal current and direct current of each said output stage amplifier to flow through the entire winding of said autotransformer and causing said direct current to flow equally in opposite directions, whereby only said direct current is cancelled.

3. The device of claim 2 wherein said means causing said current flow through said entire autotransformer includes a first direct voltage source connected between the anode of one said output stage amplifier and the cathode of the other said output amplifier and a second direct voltage source of equal magnitude connected between the anode of said other amplifier and the cathode of said one amplifier, whereby transformer efficiency and primary inductance are increased and magnetizing current is reduced.

4. The device of claim 3 including direct coupled feedback means connected between said secondary windings and one of said cascaded amplifier stages.

5. The device of claim 4 including a pair of driver amplifier stages having cathodes and anodes; a first direct coupled connection between one said driver anode and one said input electrode of said output stage, a second direct coupled connection between the other of said driver anodes and the other said input electrode, said direct coupled connections supplying both driving voltage and bias voltage to said input electrodes; a first resistive load means having one end connected to said one driver anode; a second resistive load means having one end connected to said other driver anode; a ground reference point; a source of positive direct voltage connected between the other ends of both said load means and said ground; a source of negative direct voltage connected between both said cathodes and said ground, whereby said positive and negative voltages provide large direct voltages across said driver stage and moderate bias voltages at said input electrodes of said output stage.

6. The device of claim 5 including means permitting driving voltage from each said driver stage to be applied to one half said entire transformer winding thereby reducing the driving voltage required by said output stage to one half, said last means comprising a grounded center tap on said autotransformer.

7. The device of claim 1 including means for selectively connecting a plurality of said secondary windings in parallel with each other while remaining in series with said primary windings to provide adjustment of the primary to secondary turns ratio of said autotransformer for connection to a load, said load being connected across said secondary windings.

References Cited in the file of this patent

UNITED STATES PATENTS

| | | |
|---|---|---|
| 1,948,303 | Lavoie | Feb. 20, 1934 |
| 2,201,345 | Percival | May 21, 1940 |
| 2,477,074 | McIntosh | July 26, 1949 |
| 2,516,181 | Bruene | July 25, 1950 |
| 2,554,279 | Tharp | May 22, 1951 |
| 2,648,727 | Rockwell | Aug. 11, 1953 |
| 2,757,331 | Patrusky et al. | July 31, 1956 |
| 2,815,408 | Hafler | Dec. 3, 1957 |
| 2,825,766 | Corderman | Mar. 4, 1958 |
| 2,833,871 | Worthen | May 6, 1958 |
| 2,846,503 | Kump | Aug. 5, 1958 |
| 2,852,675 | Oliver | Sept. 16, 1958 |